June 19, 1956 M. IRELAND 2,750,874
INTERLOCKED CONTROLS FOR COOKING APPARATUS
Original Filed Dec. 10, 1949 4 Sheets-Sheet 1

INVENTOR.
MURRAY IRELAND
BY
Karl H. Sommermeyer
Atty

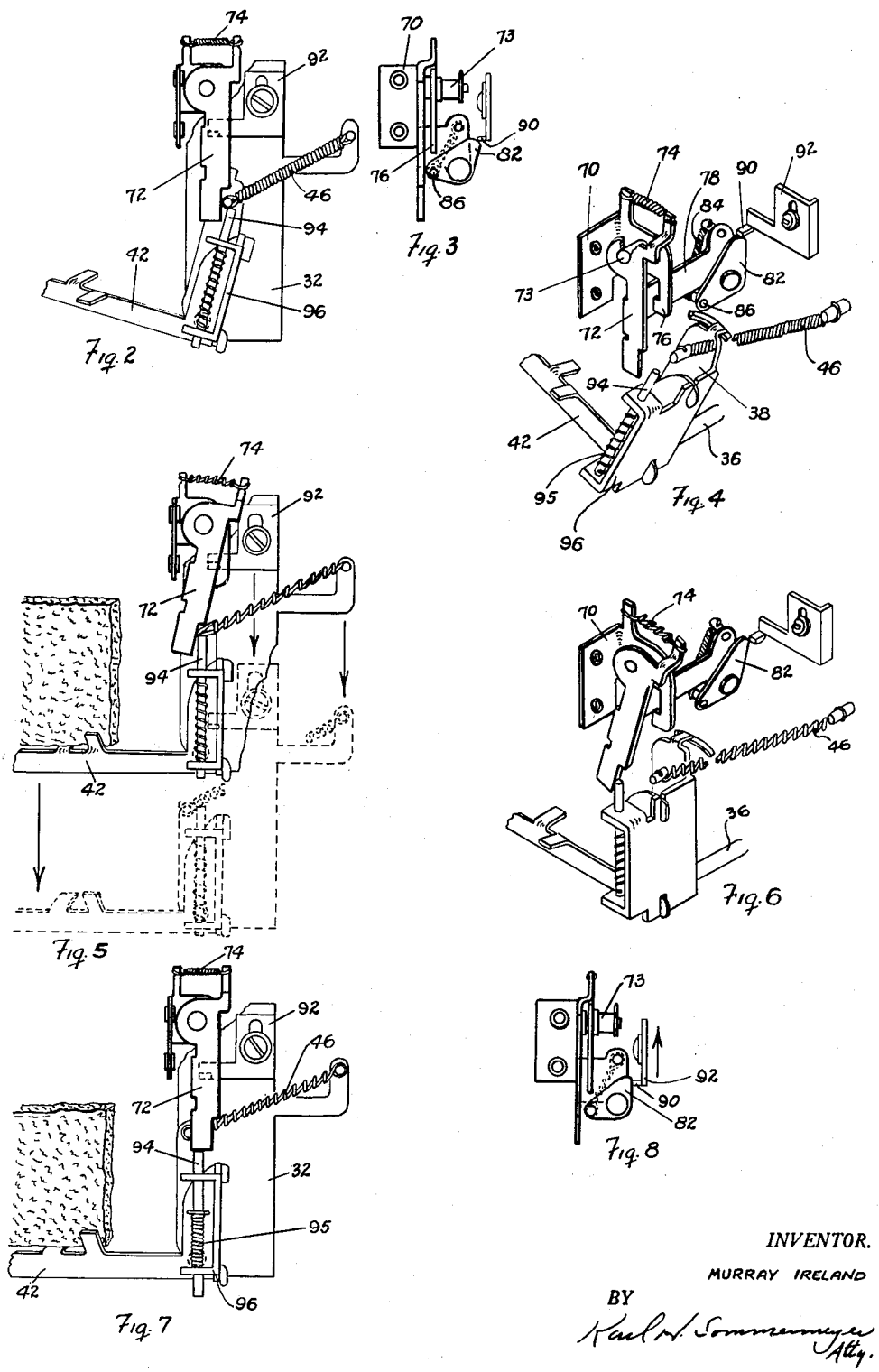

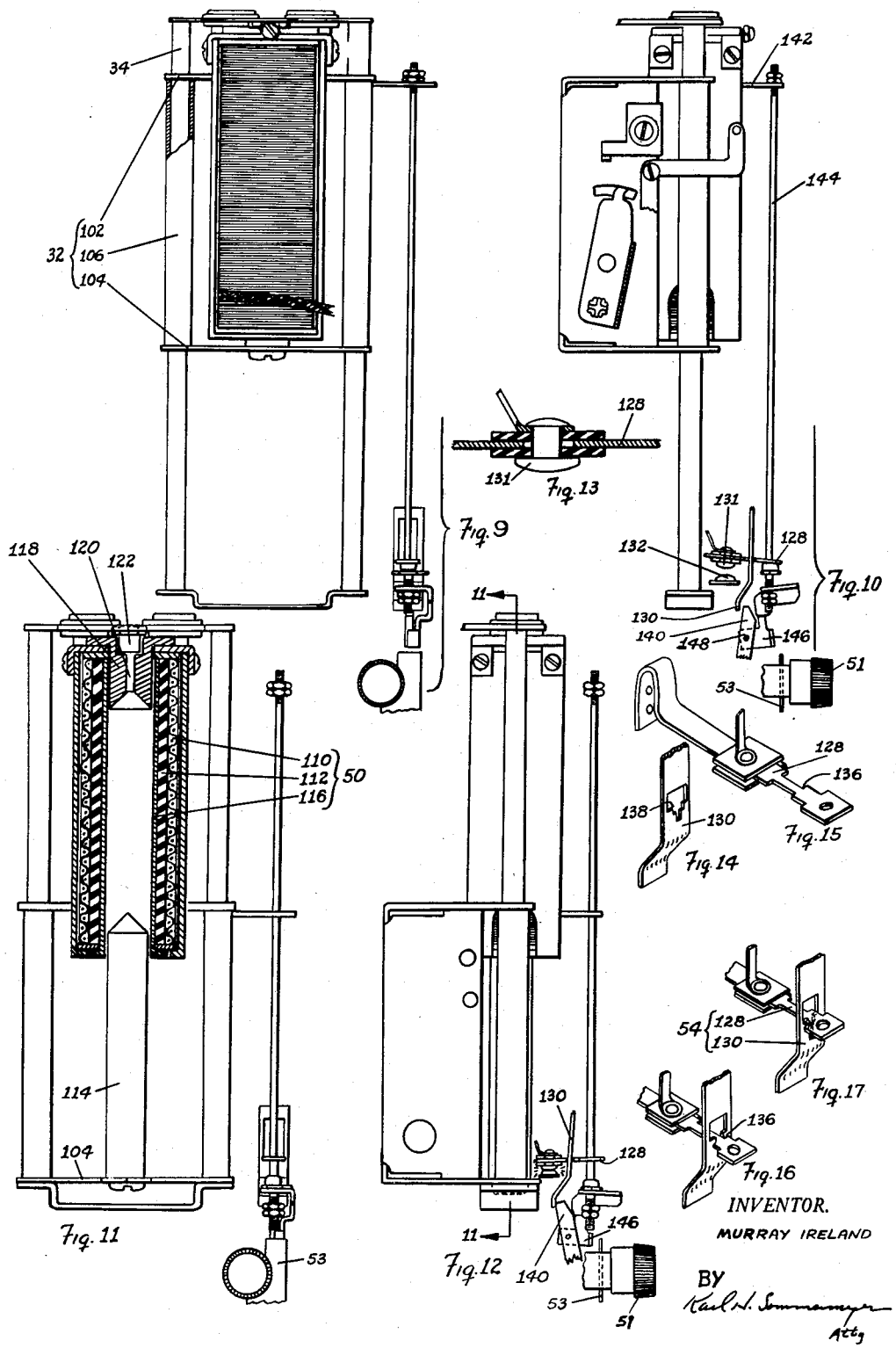

June 19, 1956 M. IRELAND 2,750,874
INTERLOCKED CONTROLS FOR COOKING APPARATUS
Original Filed Dec. 10, 1949 4 Sheets-Sheet 4

INVENTOR.
MURRAY IRELAND
BY Karl H. Sommermeyer
Atty

United States Patent Office 2,750,874
Patented June 19, 1956

2,750,874

INTERLOCKED CONTROLS FOR COOKING APPARATUS

Murray Ireland, Elgin, Ill., assignor to McGraw Electric Company, Elgin, Ill., a corporation of Delaware Original application December 10, 1949, Serial No. 132,305, now Patent No. 2,693,143, dated November 2, 1954. Divided and this application May 31, 1952, Serial No. 291,048

7 Claims. (Cl. 99—329)

The present invention relates to automatic electric toasters, and to combined controls that permit both automatic and manual control thereof. This application is a division of my copending application for Bread-Actuated Electric Toaster, Ser. No. 132,305, filed December 10, 1949, now Patent 2,693,143 dated November 2, 1954.

Objects of the present invention include the provision of an improved control mechanism for permitting both manual and automatic initiation of an operation, the provision of an improved interlocked control apparatus, and the provision of an improved automatic electric toaster. These and other objects of my invention will be apparent from the following description of certain specific embodiments thereof which illustrate the manner in which the invention may be put into practice. In the drawings:

Fig. 2 is a side elevation of a latch control mechanism constituting a part of the toaster of Fig. 1, shown in the same operated position as in Fig. 1 and viewed from the left front quarter therein;

Fig. 3 is an elevation of a part of the structure of Fig. 2 viewed from the right in Fig. 2;

Fig. 4 is a pictorial view of the mechanism of Figs. 2 and 3 shown with certain dimensions distorted for better revealing the mechanism and facilitating the explanation;

Fig. 5 is a view similar to Fig. 2 showing the mechanism in a different operated position;

Fig. 6 is a view similar to Fig. 4 showing the mechanism in the same operated position as in Fig. 5;

Fig. 7 is a view similar to Figs. 2 and 5 showing the apparatus in still another operated position;

Fig. 8 is a view similar to Fig. 3 showing the apparatus in the operated position of Fig. 7;

Fig. 9 is an end elevation of the magnet structure of the toaster of Fig. 1 as viewed from the right front quarter thereof;

Fig. 10 is an elevation showing the same mechanism viewed from the left in Fig. 9 or from the left front quarter in Fig. 1;

Figs. 11 and 12 are elevations similar to Figs. 9 and 10 but showing the apparatus in a different operated position;

Figs. 13, 14 and 15 show certain details of the switch mechanism of Figs. 9 to 12;

Figs. 16 and 17 show two operated positions of the switch mechanism of Figs. 9 to 12.

Figure 1:
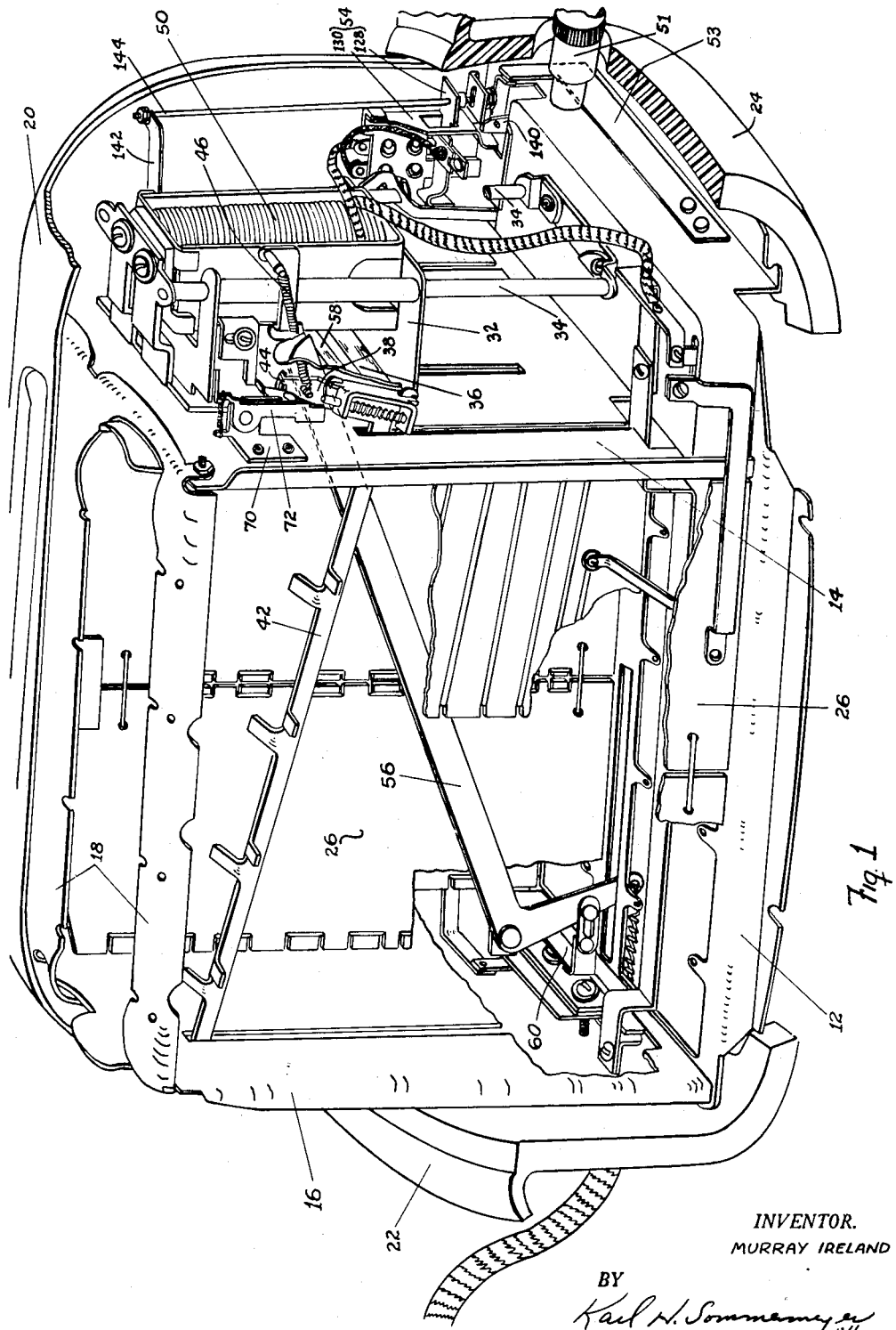
Figure 1 is a perspective view of an automatic electric toaster embodying the present invention wherein certain parts are shown cut away to reveal the mechanism and to facilitate the description.

The structure claimed in this divisional case is shown in Figs. 1 and 9 to 18, particularly in Figs. 1, 10 and 12.

In Fig. 1 the frame structure of the toaster comprises a base 12, oven end walls 14 and 16, and a slotted oven cap 18. Fastened to this frame are a slotted outer casing 20, of which only one half-shell is shown, and two handles 22 and 24. Within the frame are toasting heaters 26 which define toasting spaces for slices of bread.

Mounted on the frame structure, outside the oven wall 14, is a movable carriage 32 (see also Figs. 9 to 12) which slides on vertical guide rods 34. This carriage supports a horizontal transverse shaft 36, at each end of which is mounted a tray-supporting arm, of which only one arm 38 is shown in Fig. 1. Mounted on arm 38 is a bread rack 42 for supporting and moving a slice of bread in the toasting space between two of the heaters 26. A second similar rack is supported on the other arm at the opposite end of rod 36, as is shown and described in more detail in my copending application Ser. No. 132,303, filed December 10, 1949, now Patent 2,662,466 dated December 15, 1953. An ear 44 at the uppermost end of arm 38 lies in a slot in a side member of the carriage 32 and limits the angle through which this arm and the shaft 36 may turn for tilting the tray 42. A spring 46 normally holds the two trays tilted up in the position in which tray 42 is shown in Figs. 1 and 2. The weight of a slice of bread will swing them down to the horizontal position as shown in Fig. 5. A latch mechanism, which will be described presently in connection with Figs. 2 to 8, holds the carriage 32 in its uppermost position when the toaster is idle and releases it when the arm 38 is tilted by the weight of a slice of bread.

Also supported on the frame structure of the toaster is a solenoid magnet 50 (see also Figs. 9 and 11) for lifting the carriage 32 to its uppermost position. This magnet is energized at the end of a toasting operation by a timer (not shown) which closes a switch 54, as will be described in more detail in connection with Figs. 9 to 17. Alternatively the switch may be closed by the manual push button 51 which deflects leaf spring 53. A bell crank 56 has one end resting on a transverse rod 58 of the carriage 32 so that it is actuated by the carriage for closing a switch 60 for energizing the toasting heaters 26 whenever the carriage 32 drops to its lowermost position.

Figure 18:
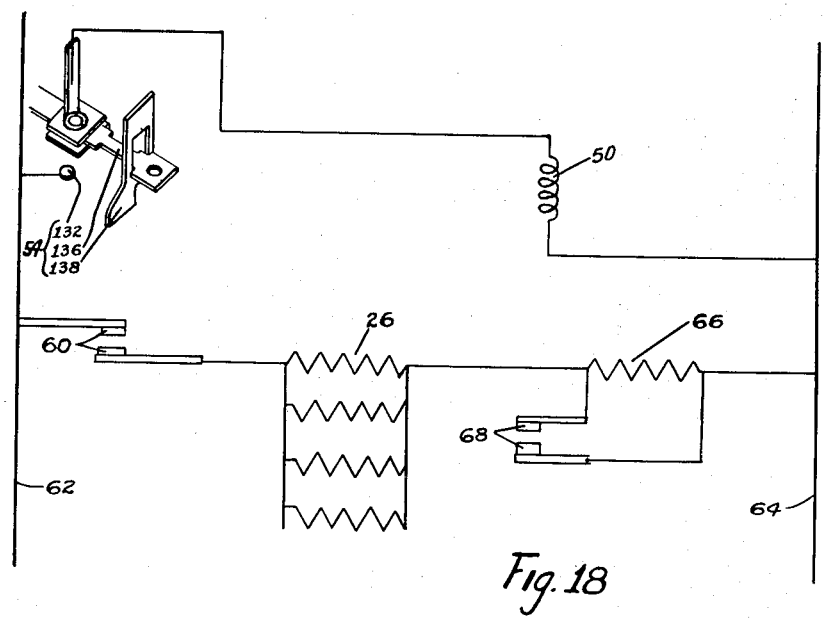
Fig. 18 is a schematic electric circuit diagram for the toaster of Figs. 1 to 17.

The electric circuit for the toaster is shown schematically in Fig. 18. Electric power such as 110 v. A. C. is applied to leads 62 and 64. The magnet 50 and its controlling switch 54 are connected in series with each other across these leads. Connected in series with the toasting heaters 26 is the switch 60 and also a heater 66 of a thermal timer which latter is shunted by timer contacts 68. While I may employ any suitable timing device or mechanism for determining the proper time to terminate the toasting operation, I prefer a thermal timer of the heat-up cool-off type such as is shown in U. S. Patent No. 2,288,-713. The heater 66 and contacts 68 are parts of such a timer and are not otherwise shown herein.

Figs. 2 to 8 show the latch mechanism for the carriage 32 more in detail and illustrate its mode of operation. In these figures the parts of the mechanism that are supported directly on the frame structure of the toaster rather than on the carriage 32 are inked in heavy lines, whereas those mounted on the carriage 32 and movable therewith are shown in light lines. Figs. 2, 3 and 4 show the mechanism in the same position as in Fig. 1, that is, in the position that the mechanism occupies when the toaster is idle and not loaded. Figs. 2 and 3 are orthographic elevations. Fig. 4 is a pictorial view having certain dimensions distorted for revealing the whole mechanism.

A bracket 70 supported on the end wall 14 of the oven (see also Fig. 1) supports a pivoted control lever 72 which normally is held by a spring 74 against a stop 76. An arm 78 of the control lever 72 carries a small latch piece 82 which normally is held by a spring 84 in the positions shown in Figs. 3 and 4 wherein pin 86 stops against the lower edge of the arm 78. A lug or abutment 90 which constitutes part of a bracket 92 fastened to the carriage 32 normally rests on the detent 82 for supporting the carriage in its uppermost position in which it is shown in Fig. 1. A pin 94 is reciprocable in a bracket 96 which constitutes a part of the pivoted arm 38 and is urged upward by spring 95 so that its upper end lies in front (to the right, as seen in Fig. 2) of the lower end of the pivoted control lever 72.

As is shown in Figs. 5 and 6, when a slice of bread is placed on the bread rack 42 the weight of the bread slice is sufficient to rotate the bread rack to the horizontal position. This action rotates bracket 96 and pin 94 to a vertical position, and in so doing moves pin 94 against the lower end of control lever 72 so as to rotate the arm 78 and the latch piece 82 about the horizontal pin 73 on which the control arm 72 is pivoted. Since the upper end of the latch 82 is considerably below the pin 73 (see Fig. 3) this rotation moves the latch 82 clear of the lug 90 and thereby releases the entire carriage 32 to let it drop. As the carriage drops, it carries with it arm 38, bracket 96, bread rack 42 and pin 94, as indicated by dotted lines in Fig. 5. Pin 94, by dropping away from control lever 72, releases it and lets it be returned by spring 74 to the position in which it appears in Figs. 2, 3 and 4, with arm 78 lying against stop 76.

The downward movement of the carriage 32 carries the bread on the rack 42 down into the space between the toasting heaters 26 (Fig. 1), and as previously mentioned, the switch 60 energizes the heaters and also the thermal timer. After the completion of the toasting operation the timer energizes magnet 50, in a manner to be explained in more detail presently, which again lifts the carriage into its uppermost position. Figs. 7 and 8 show the latch mechanism of Figs. 2 to 6 in the position it occupies just as the carriage approaches that uppermost position. As shown in Fig. 8, the lug 90 on the bracket 92 deflects the latch 82 and will be held thereby, as in Figs. 3 and 4, when the carriage reaches its uppermost position. As shown in Fig. 7, pin 94 is lifted into abutment with the lower end of control lever 72 so that the upward motion of bracket 96 compresses spring 95. It is thus seen that the upward motion of the carriage 32 does not rotate the control lever 72 but does leave the carriage latched at 82. When the toast is manually lifted from the toast racks, spring 46 swings the rack 42, arm 38, bracket 96, and pin 94 back into the position shown in Figs. 2 and 4. This motion releases pin 94 from its engagement with the bottom end face of lever 72 so that spring 95 lifts it into position where it is ready to drive the control arm 72 again when the rack 42 is reloaded.

As may be seen in Figs. 9 to 12, the carriage 32 includes horizontal plates 102 and 104 joined by tubes 106 which slide on the guide rods 34. The coil 110 and magnetic frame 112 of the magnet 50 are supported on the frame structure of the toaster. The core 114 moves vertically in and out of the coil and is fastened to the lower plate 104 of the carriage so as to move the carriage therewith. The core has a sufficiently close fit with a brass liner 116 to act as a piston therein to cushion the fall of the carriage during its downward motion. The upper end of the tube 116 is closed with a magnetic plug 118 which has an air passage 120 and a check valve 122. This valve closes during the descent of the carriage to provide the dashpot action just described and opens during the ascent so as to permit that action to take place as quickly as possible and thereby avoid noise that A. C. energization might otherwise produce.

As is shown in Figs. 16 and 17, the switch 54 includes two leaf springs 128 and 130 which interfere to provide a latch. Spring 128 carries a contact button 131 insulated therefrom as is shown in Fig. 13, which cooperates with a stationary contact 132 as shown in Figs. 10 and 12. Shoulders 136 of spring 128 and shoulders 138 of spring 130 (Figs. 14 and 15) constitute the engaging latch portions of those springs. As viewed in Figs. 10 and 12, spring 128 is biased down and spring 130 is biased toward the right. In the open position of the switch (Figs. 10 and 17) spring 128 is held in an elevated position by shoulders 138 on spring 130. When the lower end of spring 130 is deflected it permits spring 128 to flex down for bringing spring 130 into engagement with contact 132. The contacts are restored to open position by lifting spring 128.

At the end of the toasting operation an arm 140 (Figs. 1, 10 and 12) which constitutes a part of the timer, is moved to the left as shown in Fig. 12 for deflecting spring 130 and thereby closing the contacts 131—132. Alternatively, arm 140 may be deflected by the manual push button 51 which deflects spring 53 against an abutment member 146 which is hinged to the timer lever 140, as best shown in Figs. 10 and 12. Closing of the contacts 131—132 energizes the magnet 50 as previously described (see circuit, Fig. 18) to lift the carrier 32 into the position shown in Figs. 9 and 10. Arm 142, supported on the plate 102 of the carriage, slides along a vertical rod 144, and during the last bit of the upward motion of the carriage 32 this arm lifts the rod 144 which in turn lifts the latch spring 128 for opening the contacts 131—132.

Rod 144 also lifts the abutment member 146, which is important in connection with the manual button 51. When this abutment member is lifted as shown in Fig. 10, it is out of alignment with the spring 53 so that under these conditions the switch spring 130 cannot be actuated manually. In the manual control of the magnet 50, the button 51 is actuated to move the arm 140 for closing switch 130—132. The magnet 50 then lifts the carrier in a small fraction of a second and it is desirable that abutment 146 be pulled out of engagement so that it will no longer hold the spring 130 toward the left but rather will let it deflect under its own spring bias for latching the contacts 131—132 open. Furthermore, if the manual button should be held depressed, the lifting of the abutment 146 by the rod 144 disengages it from the spring 53 so that even though the button 51 should be continually held, mere lowering of the carriage could not cause the switch 131—132 to immediately reclose. The switch can be reclosed manually only by releasing the button and pushing it again.

It will be recognized that the invention is not limited to the specific details of the embodiments herein shown and described but includes such modifications and variations as fall within the scope of the appended claims.

I claim:

1. In an automatic cooking device, the combination with cooking means, a carriage for receiving and supporting an article to be cooked and for moving it relative to said cooking means to and from a cooking position, electric power means for moving said carriage for carrying an article from said cooking position, automatic control means for energizing said power means for so moving said carriage, said control means including a movable actuator, means for deenergizing said power means in response to the resulting movement of said carriage, of, manual control means operable for energizing said power means for so moving said carriage, said manual control means including a manually movable member and a shiftable force-transmitting member mechanically connecting said manually movable member to said actuator and so arranged that movement of said manual member to actuated position moves said actuator to power-means-energizing position, and means providing a connection between said carriage and said shiftable member for shifting the latter in response to power operated movement of said carriage for thereby releasing said actuator from said manual member and disabling said manual control means.

2. In an automatic cooking device, the combination with cooking means, a carriage for receiving and supporting an article to be cooked and for moving it relative to said cooking means to and from a cooking position, electric power means for moving said carriage for carrying an article from said cooking position, a switch for energizing said power means for so moving said carriage, a switch actuating member, automatic control means for operating said switch actuating member to close said switch and energize said power means, and means for opening said switch and deenergizing said power means in response to the resulting movement of said carriage, a manually movable control member and means providing a mechanical driving connection between it and said switch actuating member operable for causing said switch actuating member to close said switch and move said carriage, and a member movable in response to said movement of said carriage for interrupting said connection for thereby disabling said manual control member.

3. In combination in an automatic cooking device, cooking means, a carriage for receiving and supporting an article to be cooked and for moving it relative to said cooking means to and from a cooking position, electric power means for actuating said carriage for carrying an article from said cooking position, a switch for energizing said power means for so moving said carriage, a latch for holding said switch open, automatic control means for moving said latch for releasing said switch, whereby to close said switch and energize said power means, means for reopening said switch in response to the resulting movement of said carriage from cooking position, manual control means for moving said latch for releasing said switch, said manual control means including a manually movable member and a drive member providing a mechanical driving connection between said latch and manually movable member, said drive member being movable by movement of said carriage away from cooking position for breaking said driving connection.

4. In combination, a movable member, power means for moving it, a control member movable for actuating said power means, a latch for holding said control member in non-actuating position, automatic means for moving said latch for releasing said control member and thereby actuating said power means, means actuated by the resulting movement of said movable member for returning said control member to said non-actuating position for reengagement by said latch, a manually movable member, a driver providing a mechanical connection between said manually movable member and latch for moving said latch for releasing said control member, and a member moved by said resulting movement of said movable member for deflecting said driver for thereby interrupting said connection.

5. The combination of claim 2 wherein said connection includes a force-transmitting member between said manually movable control member and said switch-actuating member, and wherein said member movable in response to movement of the carriage moves said force-transmitting member out of operative position.

6. The combination of claim 5 wherein said manually movable member when held in manually moved position blocks the return of said force-transmitting member to its operative position.

7. In an automatic cooking device, the combination with cooking means, a carriage for receiving and supporting an article to be cooked and for moving it relative to said cooking means to and from a cooking position, electric power means for moving said carriage for carrying an article from said cooking position, a switch for energizing said power means for so moving said carriage, a switch actuating member, automatic control means for operating said switch actuating member to close said switch and energize said power means, and means for opening said switch in response to the resulting movement of said carriage, of, a manually movable control member having a mechanical connection with said switch actuating member for closing it, and a member moved by said power means in response to the closing of said switch for disconnecting said manually movable control member from said switch actuating member.

References Cited in the file of this patent
UNITED STATES PATENTS

| Re. 21,336 | Graham | Jan. 30, 1940 |
| 988,265 | Hart | Mar. 28, 1911 |
| 1,370,111 | Jackson | Mar. 1, 1921 |
| 2,194,859 | Malmquist et al. | Mar. 26, 1940 |
| 2,276,989 | Levesque | Mar. 17, 1942 |
| 2,288,699 | Gomersall et al. | July 7, 1942 |
| 2,288,713 | Ireland | July 7, 1942 |
| 2,303,561 | Koci | Dec. 1, 1942 |
| 2,336,640 | Sardeson | Dec. 14, 1943 |
| 2,515,866 | Fitzgerald | July 18, 1950 |